Jan. 10, 1961 C. C. DE PEW 2,967,637
FILLER CAP ASSEMBLY
Filed July 17, 1957
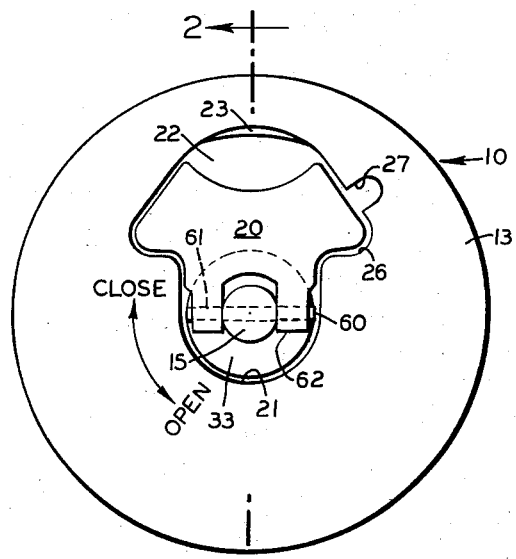
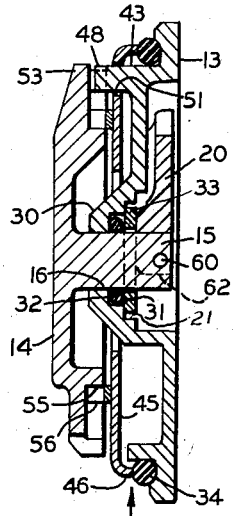
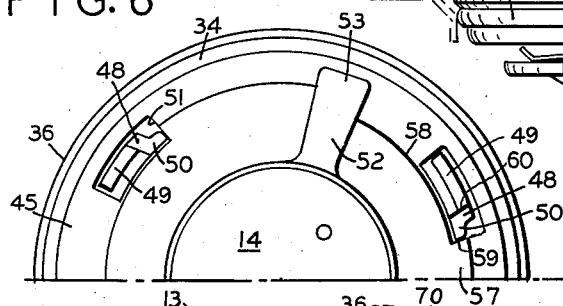
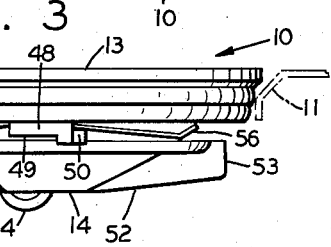
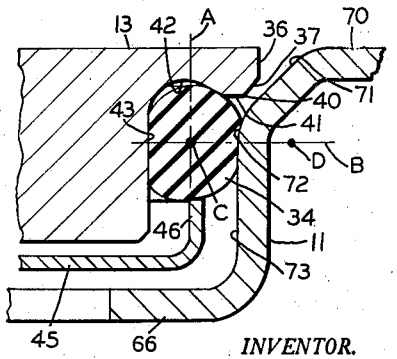
INVENTOR.
CHESTER C. DE PEW
BY John P. Chandler
HIS ATTORNEY.

United States Patent Office 2,967,637
Patented Jan. 10, 1961

2,967,637

FILLER CAP ASSEMBLY

Chester C. De Pew, Farmingdale, N.Y., assignor to Chester Corporation, Wilton, Conn., a corporation of Connecticut Filed July 17, 1957, Ser. No. 672,474

3 Claims. (Cl. 220—24.5)

This invention relates to closures for vessels containing fluids and relates more particularly to an improved closure assembly for use in tanks such as those used in aircraft which are normally maintained under positive pressure.

An important object of the present invention is the provision of a closure for the filling opening of a tank which provides a positive air-tight seal for the tank when the closure is locked but which permits the closure to become unlocked by the simple act of raising a manipulating handle, pivoted on a rotatable stud and clamping member, from its closed position in substantially flush relation with the closure plate, to a vertical position, and then rotating the handle and stud something less than one-quarter turn.

A further object of the invention is to provide an improved filler cap having camming means at the inner end of the manipulating handle, which, upon raising the handle, breaks the seal and effectively vents any pressures in the tank which are h.gher than atmospheric pressure. Until the handle and stud are rotated on the axis of the latter the cap cannot be removed and this prevents the possibility of the cap being blown into the face of the operator upon the initial unlocking action.

Another object of the invention is to provide improved means for limiting rotation of the clamping member and the manipulating handle carried thereby.

A further object of the invention is to provide a novel cap of inexpensive construction and consisting essentially of a closure plate and a clamping plate, both formed of die castings, and an O ring retaining plate stamped from sheet metal, none of which plates require any machining.

Another object of the invention is to provide a novel closure assembly having an O ring at the outer periphery of the closure plate and wherein improved means for mounting the O ring are provided. This resilient O ring has a fixed cross-sectional diameter when it is first installed and this diameter increases or decreases depending upon ambient temperatures and the nature of the fluids contained within the tank. The annular recess for the O ring is such that areas are provided to receive the greater volume of the rubber upon expansion of the ring without affecting its sealing qualities and the seal is similarly unaffected by maximum contraction or shrinking of the ring. The annular seat is also so formed that pressures developed within the tank cannot blow the O ring out of its seat.

A further object of the invention is to so correlate the O ring and its supporting groove with an O ring contacting surface of the adapter plate carried by the tank as to cause the O ring to maintain substantially the same pressure on the annular seat of the adapter under all conditions.

In the drawings:

Fig. 1 is a plan view of a filler cap embodying the present invention.

Fig. 2 is a section taken on line 2—2 of Fig. 1.

Fig. 3 is a side elevation of the filler cap.

Fig. 4 is an enlarged broken section taken through the filler cap assembly including the adapter ring and showing the contour of a new O ring upon initial mounting in the groove and before any swelling or shrinking which occurs during normal use.

Fig. 5 shows a slightly modified annular seat for the O ring and shows the relation of the parts when the O ring has shrunken in cross-sectional contour.

Fig. 6 is a broken plan view of the lower face of the closure assembly.

The embodiment of the invention shown in Figs. 1 to 6 includes a closure assembly 10 and an adapter plate or ring 11 which is suitably secured by bolts or rivets (not shown) to the margin of the opening in a tank (not shown). The closure assembly includes a closure plate 13, a clamping plate 14 provided with a central upstanding stud portion 15 which is mounted for rotation and for vertical sliding movement in an opening 16 in the center of the closure plate, and a manipulating handle 20.

The closure plate can be an inexpensive die casting and the same is true of the clamp.ng plate, neither of which requires any machining. In fact, the only machining operation required in the entire cap is the drilling of hole 16 in the closure plate and another hole in the clamping plate.

The upper surface of closure plate 13 is substantially flush with the upper surface of ring 11 and this upper surface is formed with a central recessed portion or well 21 which on one side extends to a point near the periphery as shown at 22, to receive the handle in flush relation when the closure is closed. The extension of the recess is beveled as shown at 23 to facil.tate raising of the handle. The recess has laterally extending side portions 26 to receive wing portions of the handle. A further side recess 27 is provided to facilitate insertion of a pivot pin through the handle.

The casting forming the closure plate is provided with a lowered central section shown at 30 (Fig. 2) to provide ample space for an O ring and for the handle manipulating means. Opening 16 has an enlarged portion 31 to receive an O sealing ring 32 to form an effective seal between the stud and the closure plate, and a centrally apertured bearing plate or washer 33 seated in the lower central portion of recess 21 forms the upper wall of the groove for O ring 32 and also forms a bearing surface for the camming surface at the inner end of the handle.

The contour of the outer periphery of the closure plate including the groove for a second O ring 34, forming an effective seal between the closure plate and the adapter ring, is of special importance in the present invention and this is best shown in the enlarged section of Fig. 4. Dot and dash lines A and B intersect at C which is substantially the center of O ring 34 when it is first installed and before any swelling or shrinking has taken place. The outer edge 36 is chamfered at its lower end 37.

Commencing at point 40, the outer periphery of the plate has a substantially flat annular surface 41, a concavely curved surface 42 and a vertical annular surface 43.

The O ring is retained on its seat by means of a retainer plate 45 having an upwardly turned peripheral edge 46 which engages the lower face of the O ring.

The O ring retainer plate is secured against lateral movement by a plurality of spaced downwardly projecting lugs 48 forming downward extensions of surface 43 of the closure plate. Each lug has a cut-away or recessed portion 49 and an inwardly disposed offset portion 50, both for a purpose to be described. These lugs pass through spaced openings 51 in the retainer plate.

The clamping plate 14 is provided on its lower surface with a plurality of radially disposed ribs 52 which terminate in clamping fingers 53 extending beyond the periphery of the clamping plate. These fingers underlie the inner annular portion of the adapter ring when the parts are in closed position. The ribs also serve to reinforce the clamping plate. The lower face of the latter is formed with a ring portion 54 to secure one end of a chain (not shown) which keeps the closure assembly captive when removed from the adapter ring. The upper face of the clamping plate is provided with an annular flange 55 which effectively centers a wavy washer 56 stamped from springy sheet metal which urges the clamping plate downwardly.

The means for limiting rotation of the clamping plate are as follows. The outer peripheral section 57 of the clamping plate is cut away at 58 to form a shoulder 59 (Fig. 6). When the clamping plate is rotated in a counterclockwise direction the offset portion 50 of lug 48 is contacted by shoulder 59 which stops rotation. This is the position of Fig. 6 and when the parts are in this position clamping fingers 53 underlie the inner flange of the adapter ring and when the handle is rotated downwardly to the position of Fig. 1 the closure assembly is fast on the adapter ring.

To remove the closure assembly the handle is raised and the clamping plate is rotated in the opposite direction. When clamping fingers 53 encounter shoulder 60 formed by recess 49 the rotation is stopped and the closure assembly can be removed from its adapter by lifting it out with handle 20.

To assemble the closure the wavy washer 56 is first placed on the upper face of the clamping plate outside the annular flange 55, and the retainer plate 45 then placed on the wavy washer. The stud 15 is now passed upwardly through central opening 16 in the closure plate 13, to which O ring 34 has previously been applied. The O ring 32 and bearing plate 33 are positioned in place and the handle 20 mounted at the upper end of the stud by passing a pin 60 through aligned openings 61 in the stud and handle.

The bifurcated portions 62 of the handle lying on the opposite sides of the pivot form camming surfaces to draw the clamping plate upwardly. It will be noted in Fig. 2 that the distance between the end faces of these bifurcated portions and the pivot is less than the distance between the adjoining faces thereof and the pivot. It will further be seen that there is a curved corner between this lower face and the adjoining wall. This curved corner works against bearing plate 33 when the handle is moved from its upper vertical or open position, downwardly to the horizontal closed position of Figs. 1 and 2.

When the handle is raised from this latter position the firm seal between the O ring and the adapter plate is broken. The handle is now rotated to a point where finger 53 contacts stop 59 and the clamping fingers 53 are now wholly within recesses 49 to enable the fingers and the adjoining lugs to pass through notches (not shown) in the lower annular wall 66 of the adapter 11. From upper wall 70 of the adapter ring there is a downwardly inclined annular surface 71 which merges into a curved surface 72 forming the arc of a circle whose center is at point D. This curved surface merges at line B into a straight vertical surface 73.

When the O ring 34 is first mounted within its annular seat it has its means cross-sectional diameter which later sometimes swells and also contracts. Surfaces 42 and 43 of its seat cause it to be slightly out-of-round on its inner surface and when its outer surface contacts surfaces 72—73 of the adapter it becomes further out-of-round as shown in Fig. 4. This figure does show, however, how effective is the seal in four distinct areas around the periphery of the O ring. When the ring swells due to certain constituents in the fuel it expands largely into the area below curved wall 42. Fig. 5 shows a slight modification in the retainer plate 45' wherein the upwardly turned peripheral flange 46' extends further outwardly than it does in Fig. 4, said flange acting as a locating pilot when the closure is inserted in the adapter. Fig. 5 also shows the position of the ring when it has shrunk somewhat in cross sectional area. It will be appreciated that when this occurs the circumference of the ring also decreases but, regardless of whether it shrinks or expands, it is nevertheless confined within its upwardly recessed seat in the filler cap.

What I claim is:

1. The combination of a filler cap for a tank and an apertured adapter therefor, said adapter being provided with a downwardly and inwardly curved annular flange and a vertically slotted ring at the lower end of the flange, said cap including a closure plate having a central aperture and an annular outwardly and downwardly opening groove below its upper marginal edge, and a resilient O ring in said groove, the upper end of said groove being substantially C-shaped in cross section and of such size as to provide a space into which the O ring can expand, and a retainer plate with an upwardly extending annular flange engaging the lower section of the ring to confine it within the slot, the downwardly curved annular flange of the adapter forming the arc of a circle whose center is on substantially the same horizontal plane as the center of the O ring, which latter engages said curved flange when the cap is in closed position, and a rotatable clamping plate carried by the closure plate and provided with clamping fingers which underlie the slotted adapter ring, a stud portion extending upwardly from the center of the clamping plate and through the central aperture of the closure plate, a handle pivoted at the upper end of the stud portion and provided with a camming surface which engages the closure plate and which, when the handle is rotated from open position, where it is substantially vertical, to closed position, where it is flat against the closure plate, simultaneously urges the fingers upwardly against the O ring and the closure plate downwardly to compress the O ring against the curved flange.

2. The structure recited in claim 1 wherein the closure plate is provided with lugs which extend below the retainer plate and which have recesses on one side thereof to receive the clamping fingers in nested relation when they pass through the slotted ring and form a stop limiting rotation in one direction, and a shoulder on the clamping plate which engages one of said lugs to limit rotation in the opposite direction.

3. The structure recited in claim 1 wherein the annular flange of the retainer plate has a diameter only slightly less than the adjacent diameter of the adapter so as to act as a pilot for the filler cap as it is inserted into the adapter.

References Cited in the file of this patent

UNITED STATES PATENTS

| | | |
|---|---|---|
| 496,438 | O'Brien | May 2, 1893 |
| 1,015,907 | Ryder | Jan. 30, 1912 |
| 1,174,278 | Prier | Mar. 7, 1916 |
| 2,306,699 | Johnson | Dec. 29, 1942 |
| 2,416,637 | Minella | Feb. 25, 1947 |
| 2,465,727 | Jensen | Mar. 29, 1949 |
| 2,488,796 | Baier | Nov. 22, 1949 |
| 2,564,232 | Rausenberger | Aug. 14, 1951 |
| 2,616,584 | Rausenberger | Nov. 4, 1952 |
| 2,720,999 | Gamundi | Oct. 18, 1955 |